United States Patent
Hayashi et al.

(10) Patent No.: US 7,366,536 B2
(45) Date of Patent: Apr. 29, 2008

(54) TRANSMISSION POWER CONTROL METHOD AND RADIO CONTROL APPARATUS IN MOBILE PACKET COMMUNICATION SYSTEM

(75) Inventors: Takahiro Hayashi, Yokosuka (JP); Yoshihiro Ishikawa, Yokosuka (JP); Mikio Iwamura, Zushi (JP); Hidehiro Ando, Yokohama (JP); Takehiro Nakamura, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 728 days.

(21) Appl. No.: 10/489,610

(22) PCT Filed: Sep. 20, 2002

(86) PCT No.: PCT/JP02/09694

§ 371 (c)(1),
(2), (4) Date: Mar. 22, 2004

(87) PCT Pub. No.: WO03/032528

PCT Pub. Date: Apr. 17, 2003

(65) Prior Publication Data

US 2004/0242255 A1    Dec. 2, 2004

(30) Foreign Application Priority Data

Sep. 21, 2001    (JP)    ............................ 2001-290130

(51) Int. Cl.
*H04Q 7/20*    (2006.01)
(52) U.S. Cl. ........................................ 455/522; 455/69
(58) Field of Classification Search ................ 455/442, 455/522, 69

See application file for complete search history.

(56) References Cited

U.S. PATENT DOCUMENTS 6,823,193 B1 * 11/2004 Persson et al. ............. 455/522

FOREIGN PATENT DOCUMENTS

JP    8-116306    5/1996

(Continued)

*Primary Examiner*—Philip J. Sobutka
(74) *Attorney, Agent, or Firm*—Oblon, Spivak, McClelland, Maier & Neustadt, P.C.

(57) ABSTRACT

A downlink user data signal destined for a specific mobile station (4-1) is always transmitted from a single base station while a plurality of base stations (3-1, 3-2, 3-3, ...) being switched from one to another. A first downlink signal destined for the mobile station (4-1) is transmitted from one or a plurality of base stations through a first downlink radio channel (downlink A-DPCR). The transmission power of a second downlink radio channel (PDSCH, HS-SCCH) for transmitting a second downlink signal from the base station (3-1) to the mobile station (4-1) is provided with an offset relative to the transmission power of the first downlink radio channel from the base station (3-1) to the mobile station (4-1), thereby linking the transmission power of the second downlink radio channel with the transmission power of the first downlink radio channel. If the number of diversity branches, i.e., the number of base stations (3-1, 3-2) simultaneously communicating with the mobile station (4-1) on the first downlink radio channel (downlink A-DPCH) is large, the offset for the transmission power of the second downlink radio channel (PDSCH, HS-SCCH) is increased. If the number of diversity branches is small, the offset for the transmission power of the second downlink radio channel is decreased. In this way, the offset is determined. As a result, in mobile packet communication that transmits user data for a plurality of mobile stations through a single radio channel by temporally multiplexing the data, the reception quality of the second downlink signal transmitted from the specific base station (3-1) on the second downlink radio channel (PDSCH, HS-SCCH) can always properly be maintained.

13 Claims, 10 Drawing Sheets

FOREIGN PATENT DOCUMENTS

| | | |
|---|---|---|
| JP | 9-74378 | 3/1997 |
| JP | 2002-290327 | 10/2002 |
| JP | 2002-330461 | 11/2002 |
| WO | 00/33480 | 6/2000 |

* cited by examiner

TRANSMISSION POWER CONTROL METHOD AND RADIO CONTROL APPARATUS IN MOBILE PACKET COMMUNICATION SYSTEM

TECHNICAL FIELD

The present invention relates to a transmission power controlling method and a radio network control apparatus for a mobile packet communication system.

BACKGROUND TECHNOLOGY

Figure 1:
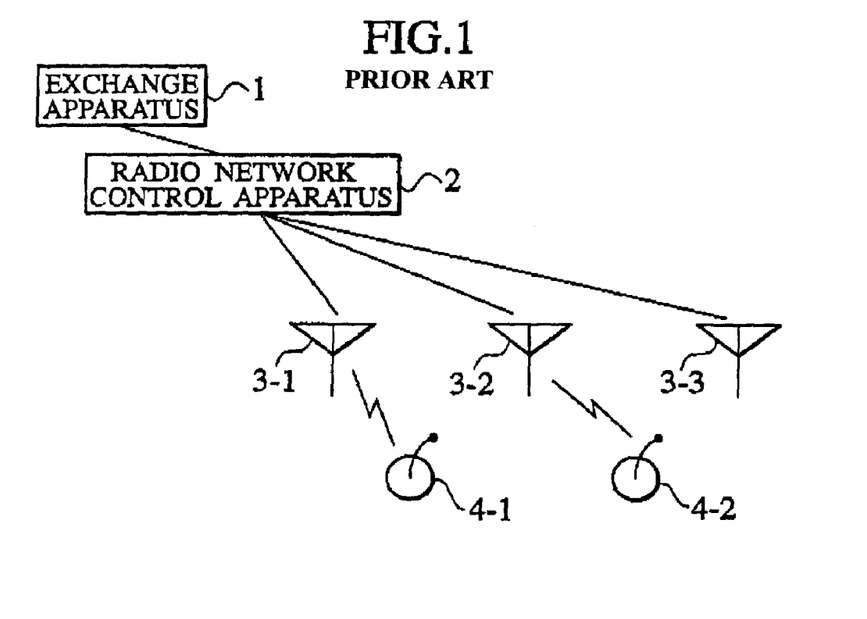
FIG. 1 is a block diagram showing a standard mobile packet communication system.

FIG. 1 shows a configuration of a standard mobile packet communication system consisting of an exchange apparatus 1, a radio network control apparatus 2, base stations 3-1, 3-2, 3-3, . . . controlled by the radio network control apparatus 2, and mobile stations 4-1, 4-2, . . . wirelessly communicating with one or a plurality of the base stations and possessed by users, respectively.

TABLE 1

Correspondence between transport channels and physical channels

| Transport channel name | Physical channel name | Official name |
|---|---|---|
| DCH | A-DPCH | Associated-Dedicated Physical Channel |
| DCH | DPCH | Dedicated Physical Channel |
| DSCH | PDSCH | Physical Downlink Shared Channel |

Figure 2:
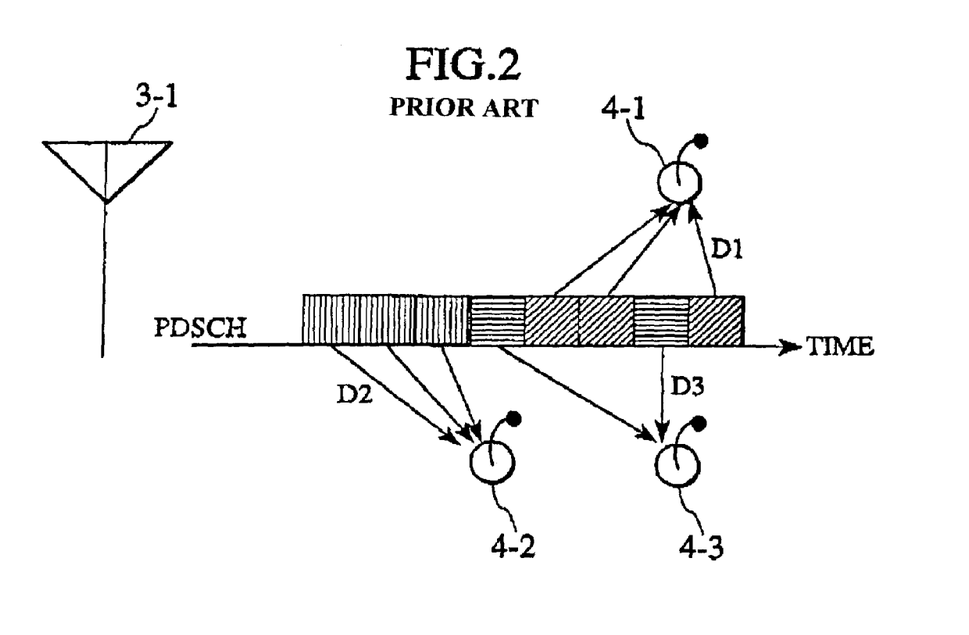
FIG. 2 is an explanatory view showing a scheme of time multiplexing transmission on a PDSCH according to the standard mobile packet communication system.

This system achieves mobile packet communication by efficiently utilizing frequencies and by considering a characteristic of packet communication that a certain extent of delay is allowable. FIG. 2 shows a communication technique usually employed by the system. The base station 3 transmits data pieces D1, D2, and D3 to the user mobile stations 4-1, 4-2, and 4-3, respectively, by temporally multiplexing the data pieces on a single radio channel PDSCH (Physical Downlink Shared CHannel).

This specification uses as a radio channel name a physical channel name instead of a transport channel name. Table 1 shows correspondence between transport channel names and physical channel names.

Figure 3:
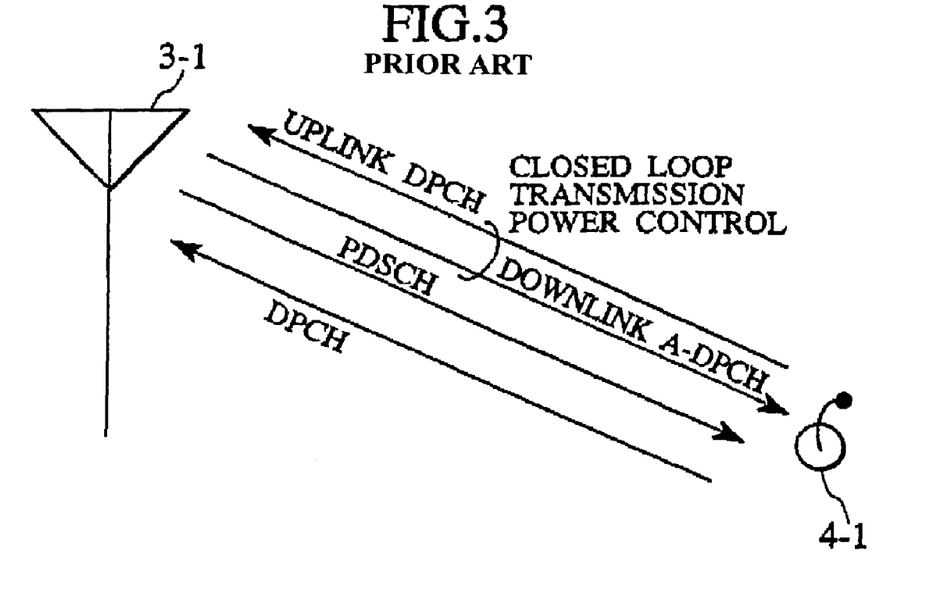
FIG. 3 is an explanatory view showing signal channels for communication between a base station and a mobile station according to a conventional mobile packet communication system.

To allow a single radio channel to be shared by a plurality of users, a prior art employs a channel configuration shown in FIG. 3. Separately from a shared channel PDSCH for transmitting data (downlink user data) for user mobile stations, there are A-DPCHs (Associated-Dedicated Physical CHannels) in an uplink and a downlink, respectively, to control transmission power. The uplink also involves a physical channel DPCH (Dedicated Physical CHannel) to multiplex uplink user data and control information sent from a mobile station.

According to the communication system of the prior art, the physical channel A-DPCH in the downlink only has a task of transmitting control signals, and therefore, is set at a relatively low channel speed. On the other hand, the physical channel DPCH in the uplink transmits control signals as well as user data, and therefore, is set at a channel speed higher than the downlink physical channel A-DPCH. The shared channel PDSCH in the downlink is set at a channel speed that is further higher than the downlink physical channel A-DPCH, to carryout high-speed data communication.

When conducting communication with the use of the high-speed shared channel PDSCH, a PDSCH transmission notice is sent to a mobile station through the A-DPCH before transmitting data with a radio frame on the PDSCH. Upon receiving the notice, the mobile station confirms the PDSCH transmission, and then, starts receiving the data on the PDSCH.

In this way, according to the conventional mobile packet communication system, a base station notifies a plurality of mobile stations of shared channel PDSCH transmission through the downlink physical channel A-DPCH, and then, transmits user data through the PDSCH. Namely, user data for a plurality of users are transmitted to a plurality of mobile stations by temporally multiplexing the data. In FIG. 3, the downlink involves two channels, i.e., the physical channel A-DPCH and shared channel PDSCH. The PDSCH is not always set but is set only when notification is made through the A-DPCH.

Figure 4:
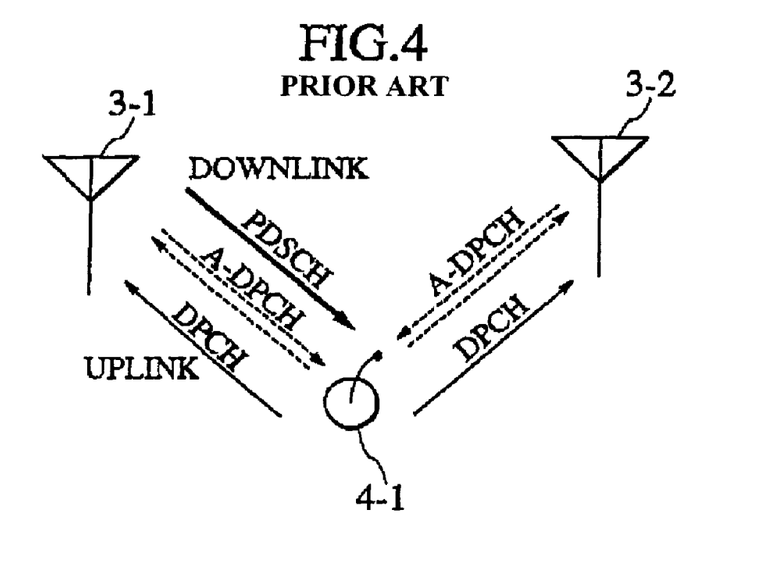
FIG. 4 is an explanatory view showing signal channels for communication between a plurality of base stations and a mobile station according to the conventional mobile packet communication system.

Conventionally, the mobile packet communication mentioned above uses a technique called diversity reception (hereinafter referred to as "DHO") to improve the line quality of the physical channel A-DPCH and shared channel PDSCH in the downlink. FIG. 4 shows a channel configuration of mobile packet communication employing the DHO technique. The base stations 3-1 and 3-2 simultaneously transmit signals through the downlink physical channels A-DPCHs and receive the uplink physical channel DPCH from the mobile station 4-1. However, no DHO is applied to the shared downlink channel PDSCH for transmitting user data because user data of a plurality of users are temporally multiplexed, and therefore, it is difficult to control data transmission timing in DHO. Accordingly, only one base station, e.g., the base station 3-1 uses the PDSCH for data transmission.

A code division multiple access (hereinafter referred to as "CDMA") method is a radio communication technique employing codes to establish a channel. For such a technique, transmission power control is important and essential, A W-CDMA system (Wideband Code Division Multiple Access system) adopted by IMT-2000 employs a technique called high-speed transmission power control. The high-speed transmission power control technique is applicable not only to the W-CDMA system but also to TDMA and FDMA Systems.

Figure 5:
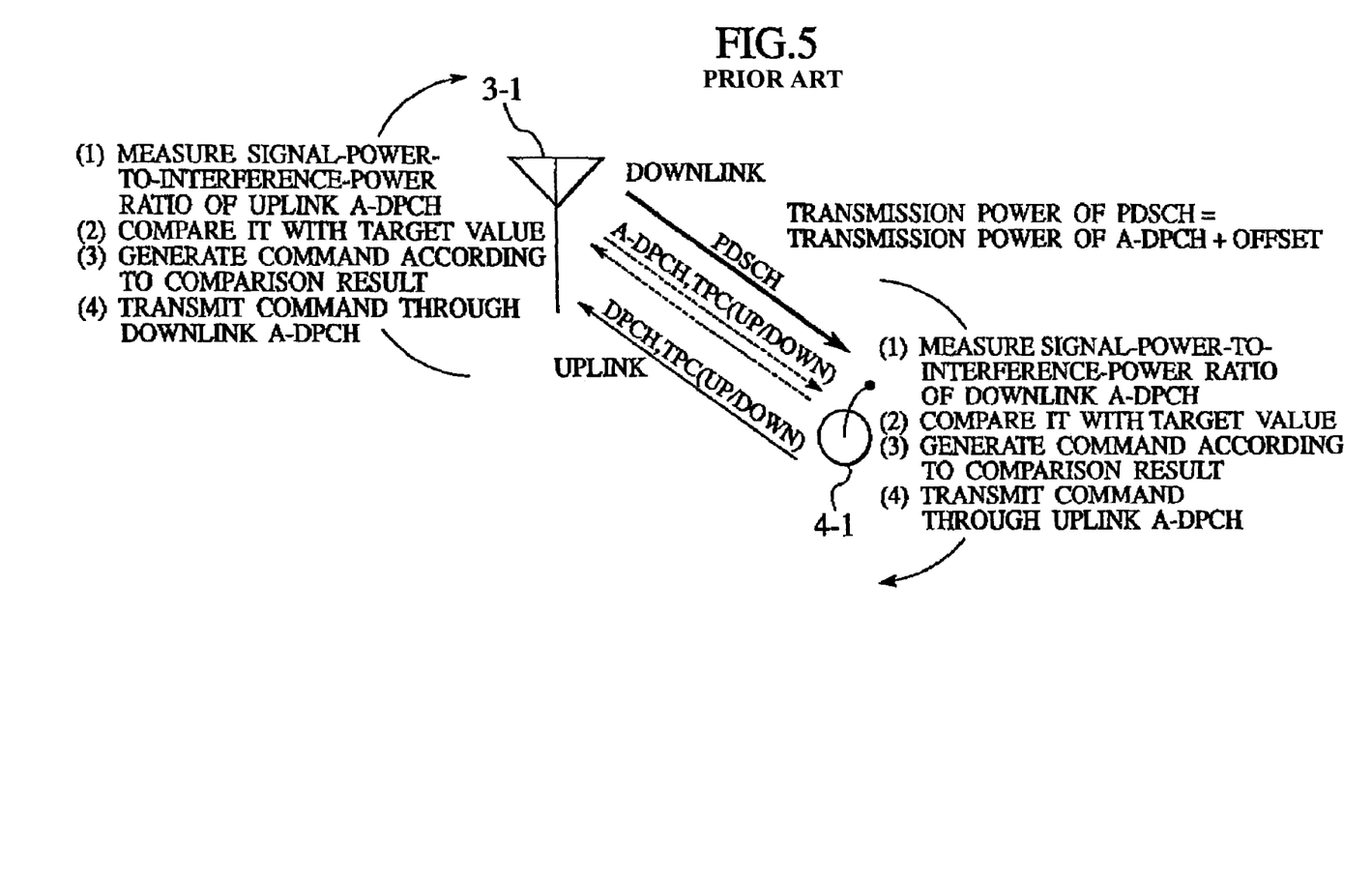
FIG. 5 is an explanatory view showing transmission power control using A-DPCH and DPCH for communication between a base station and a mobile station according to the conventional mobile packet communication system.
Figure 6:
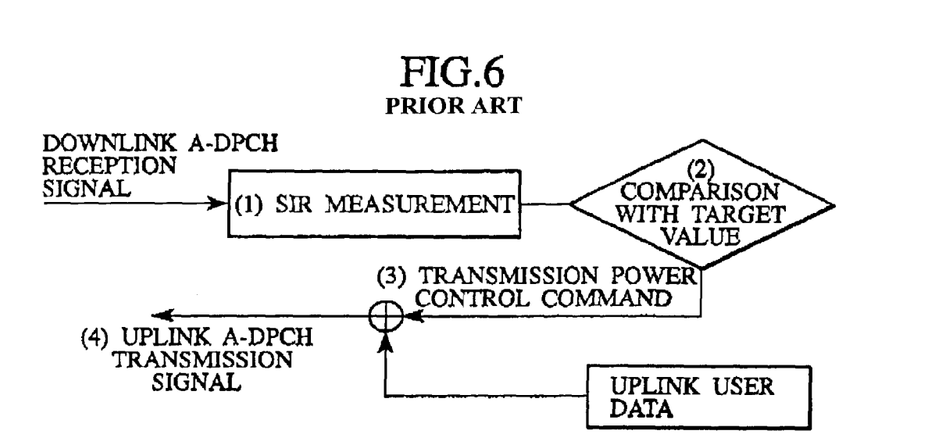
FIG. 6 is a flowchart showing a process of generating a transmission power control command at a mobile station according to the conventional mobile packet communication system.
Figure 7:
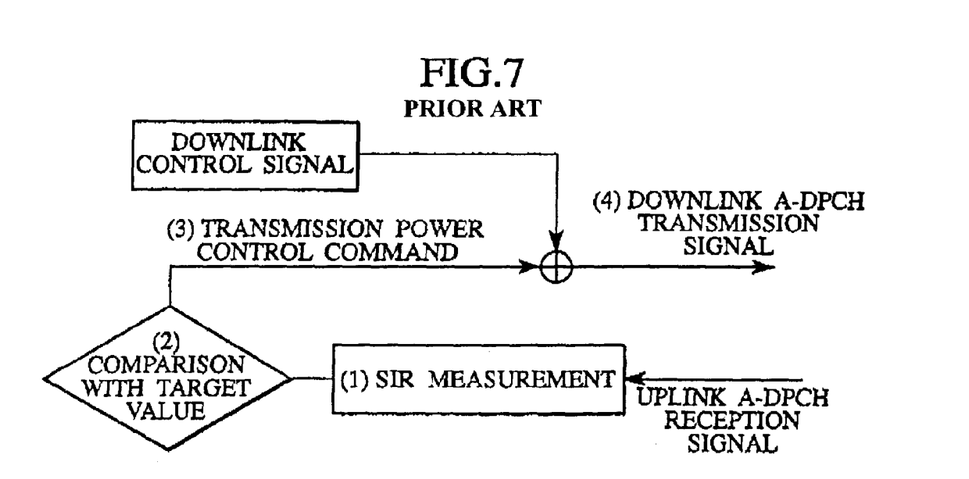
FIG. 7 is a flowchart showing a process of generating a transmission power control command at a base station according to the conventional mobile packet communication system.

FIGS. 5 to 7 show an operation of transmission power control for CDMA.

In FIGS. 5 and 6, the mobile station 4-1:

(1) calculates a signal-power-to-interference-power ratio (hereinafter referred to as "SIR") of the downlink physical channels A-DPCH always transmitted from the base stations 3-1 and 3-2;

(2) compares a result of the calculation with a predetermined target value;

(3) if the comparison indicates that the calculated SIR is lower than the target value, generates a transmission power control command to command the base stations 3-1 and 3-2 to increase the transmission power of the A-DPCH, and if the comparison indicates that the SIR is greater than the target value, generates a transmission power control command to command that the transmission power of radio signals for the mobile station must be decreased; and (4) transmits the generated transmission power control command to the base stations 3-1 and 3-2 on the uplink physical channel A-DPCH.

In FIGS. 5 and 7, the base station 3-1:

(1) calculates a SIR of the uplink A-DPCH from the mobile station 4-1;

(2) compares the SIR of the A-DPCH with a predetermined target value, like the above-mentioned case of the mobile station;

(3) if the comparison indicates that the target value is lower than the SIR of the A-DPCH, generates a transmission power control command to command the mobile station 4-1 to increase the transmission power of uplink radio signals, and if the comparison indicates that the SIR of the A-DPCH is greater than the target value, generates a transmission power control command to command that the transmission power of uplink radio signals must be decreased; and (4) transmits the generated transmission power control command to the mobile station 4-1 on the downlink physical channel A-DPCH.

In this way, radio signal transmission power between the base station 3-1 and the mobile station 4-1 is adjusted to always maintain optimum transmission power.

On the other hand, the transmission power of the shared downlink channel PDSCH is controlled according to a value obtained by multiplying a transmission power value of the physical channel A-DPCH in the same downlink by a predetermined value, i.e., an offset value. This is because the transmission power of the downlink A-DPCH is considered to be always optimally controlled according to a transmission power control command transmitted from a mobile station and because the A-DPCH and PDSCH are simultaneously transmitted. Accordingly, it is possible to consider the A-DPCH and PDSCH are in the same radio channel state. The offset value is notified from the radio network control apparatus 2 to each of the base stations 3-1, 3-2, and 3-3 in the mobile packet communication system of FIG. 9.

Figure 8:
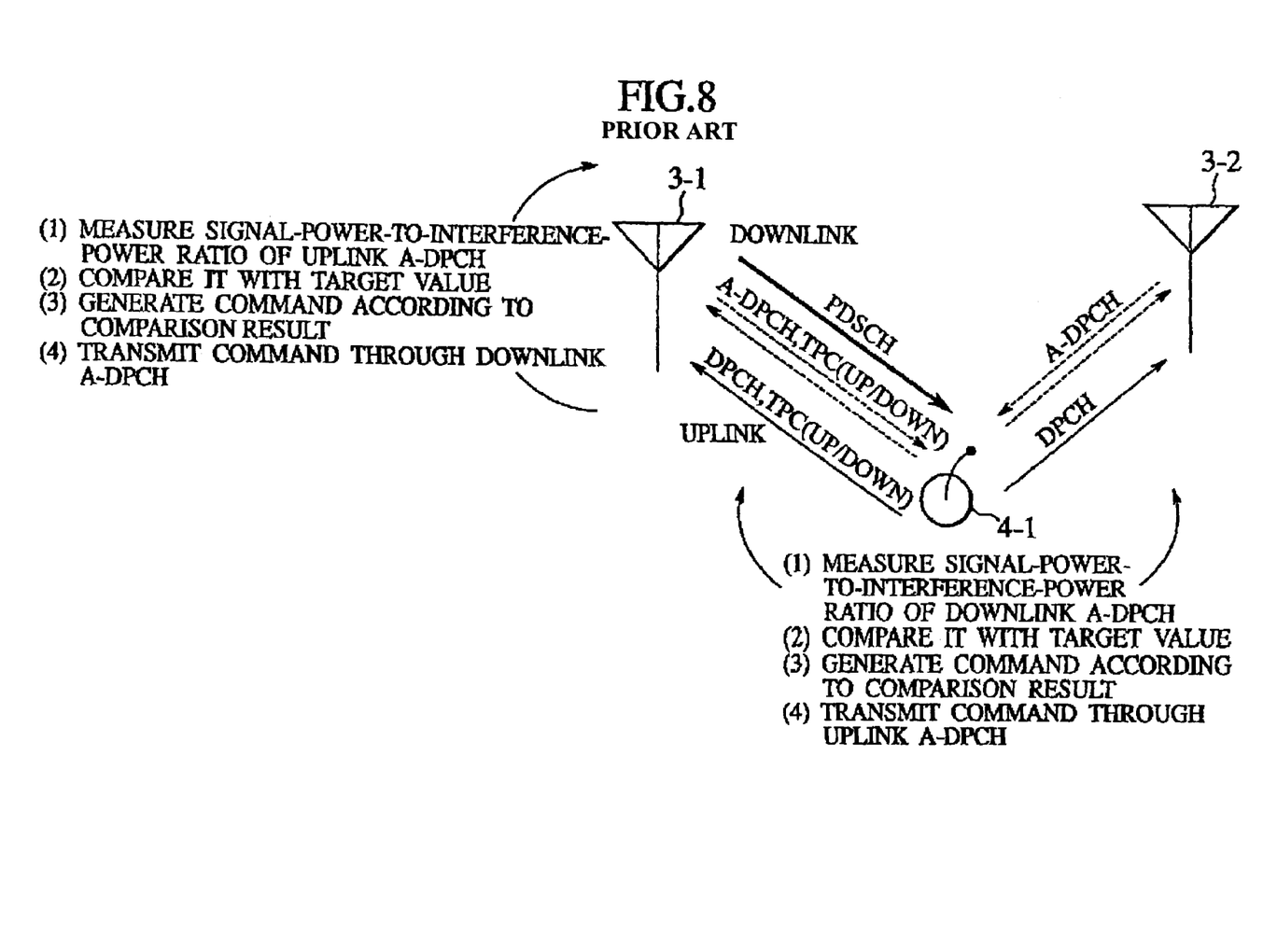
FIG. 8 is an explanatory view showing a method of controlling transmission power between two base stations and a mobile station in a diversity mode according to the conventional mobile packet communication system.

The conventional mobile packet communication system, however, will cause a problem during diversity reception (DHO). This problem will be clarified with reference to FIG.

Each of the base stations 3-1 and 3-2:

(1) calculates, at each of the base stations 3-1 and 3-2, a SIR of the A-DPCH when receiving the uplink physical channel A-DPCH from a mobile station;

(2) compares it with a target value;

(3) generates a transmission power control command to command a transmission power increase or decrease; and (4) transmits, from each of the base stations, the transmission power control command to the same mobile station through the downlink physical channel A-DPCH of the base station.

Accordingly, the mobile station receives the two transmission power control commands.

On the other hand, the mobile station:

(1) receives the two A-DPCHs from the separate base stations, combines the two A-DPCHs according to a predetermined procedure, and calculates a SIR of the combined A-DPCHs;

(2) compares the SIR with a target value;

(3) generates, according to a comparison result, a transmission power control command to command a transmission power increase or decrease; and (4) transmits the transmission power control command on the uplink physical channel A-DPCH.

This A-DPCH is transmitted from the mobile station 4-1 simultaneously to the base stations 3-1 and 3-2. This A-DPCH is a single radio signal although FIG. 8 shows two lines representative of the signal. The separate base stations 3-1 and 3-2 receive the same A-DPCH from the mobile station 4-1.

According to the DHO technique, a mobile station receives signals from a plurality of base stations and combines the signals into one. As a result, combined gains improve the quality of the downlink A-DPCHs. Similarly, a base station can receive a radio signal from a mobile station at a plurality of locations and combine the received signals into one to improve the quality of A-DPCH.

When considering the downlink A-DPCHs during DHO, it is understood that the base stations 3-1 and 3-2 simultaneously transmit radio signals and the mobile station 4-1 combines the signals together. Accordingly, the transmission power of the downlink A-DPCH of each of the base stations 3-1 and 3-2 can be small to realize the same SIR as that obtained when no DHO is carried out (i.e., a single base station transmits the downlink A-DPCH). More simply, transmitting a signal from two base stations instead of a single base station can halve the transmission power of each base station.

During DHO, the transmission power of the downlink physical channel A-DPCH of each of the base stations 3-1 and 3-2 is reduced. However, the transmission power of the downlink shared channel PDSCH is calculated by multiplying the downlink A-DPCH of the base station 3-1, which transmits the PDSCH, by an offset value without DHO. This results in deteriorating the reception quality of the PDSCH during DHO.

The present invention has been made to overcome these conventional problems. An object of the present invention is to provide a technique of always maintaining good reception quality on a PDSCH during diversity reception in mobile packet communication that transmits user data for a plurality of mobile stations by temporally multiplexing the user data on the single radio channel PDSCH.

Another object of the present invention is to provide a technique of always maintaining good reception quality on an HS-SCCH (High Speed Shared Control CHannel) of an HSDPA (High Speed Downlink Packet Access) method that fixes the transmission power of a data transmission channel and variably controls data quantities.

DISCLOSURE OF THE PRESENT INVENTION

An aspect of the present invention provides a transmission power controlling method for a mobile packet communication system. The method includes:

a step in which a mobile station checks a signal state of a first downlink radio channel from each of one or a plurality of base stations from which the mobile station can receive signal radio waves, and based on the signal state of the first downlink radio channel, transmits a transmission power control command to command a transmission power increase or decrease to each of the base stations through an uplink radio channel paired with the first downlink radio channel;

a step in which each of one or a plurality of base stations specified by a radio network control apparatus to conduct communication with the mobile station checks a signal state of the uplink radio channel from the mobile station, and based on the signal state of the uplink radio channel, transmits a transmission power control command to command a transmission power increase or decrease through the first downlink radio channel paired with the uplink radio channel;

a step in which the radio network control apparatus detects the number of diversity branches of the mobile station communicating with the base stations, increases an offset if the detected number of diversity branches is large, and decreases the offset if the number of diversity branches is small, to thereby determine the offset;

a step in which the radio network control apparatus specifies, from among the one or plurality of base stations, a transmitter base station to transmit signals to the mobile station through a second downlink radio channel and notifies the transmitter base station to set transmission power of the second downlink radio channel to transmit signals to the mobile station by multiplying transmission power of the first downlink radio channel by the offset; and a step in which the transmitter base station to transmit signals to the mobile station through the second downlink radio channel adjusts transmission power of the second downlink radio channel according to the notification from the radio network control apparatus and transmits downlink signals transferred from the radio network control apparatus.

Another aspect of the present invention provides a transmission power controlling method for a radio network control apparatus in a mobile packet communication system, including a step of making each of one or a plurality of base stations transmit a first downlink signal for a specific mobile station through a first downlink radio channel, a step of detecting the number of diversity branches of the mobile station, increasing an offset if the detected number of diversity branches is large and decreasing the offset if the number of the diversity branches is small, to thereby determine the offset, and a step of specifying, from among the one or plurality of base stations, a transmitter base station to transmit a downlink signal to the mobile station through a second downlink radio channel and notifying the transmitter base station to set transmission power of the second downlink radio channel by multiplying transmission power of the first downlink radio channel by the offset.

Still another aspect of the present invention provides a radio network control apparatus having a diversity branch controller to control an increase or a decrease in the number of diversity branches, a storage unit to store the number of diversity branches of each connected mobile station, and an offset calculator to determine an offset value for transmission power of a specific downlink radio channel for a given mobile station according to the number of diversity branches of the given mobile station stored in the storage unit and notify a base station concerned of the offset value.

BEST MODE OF IMPLEMENTATION

Figure 9:
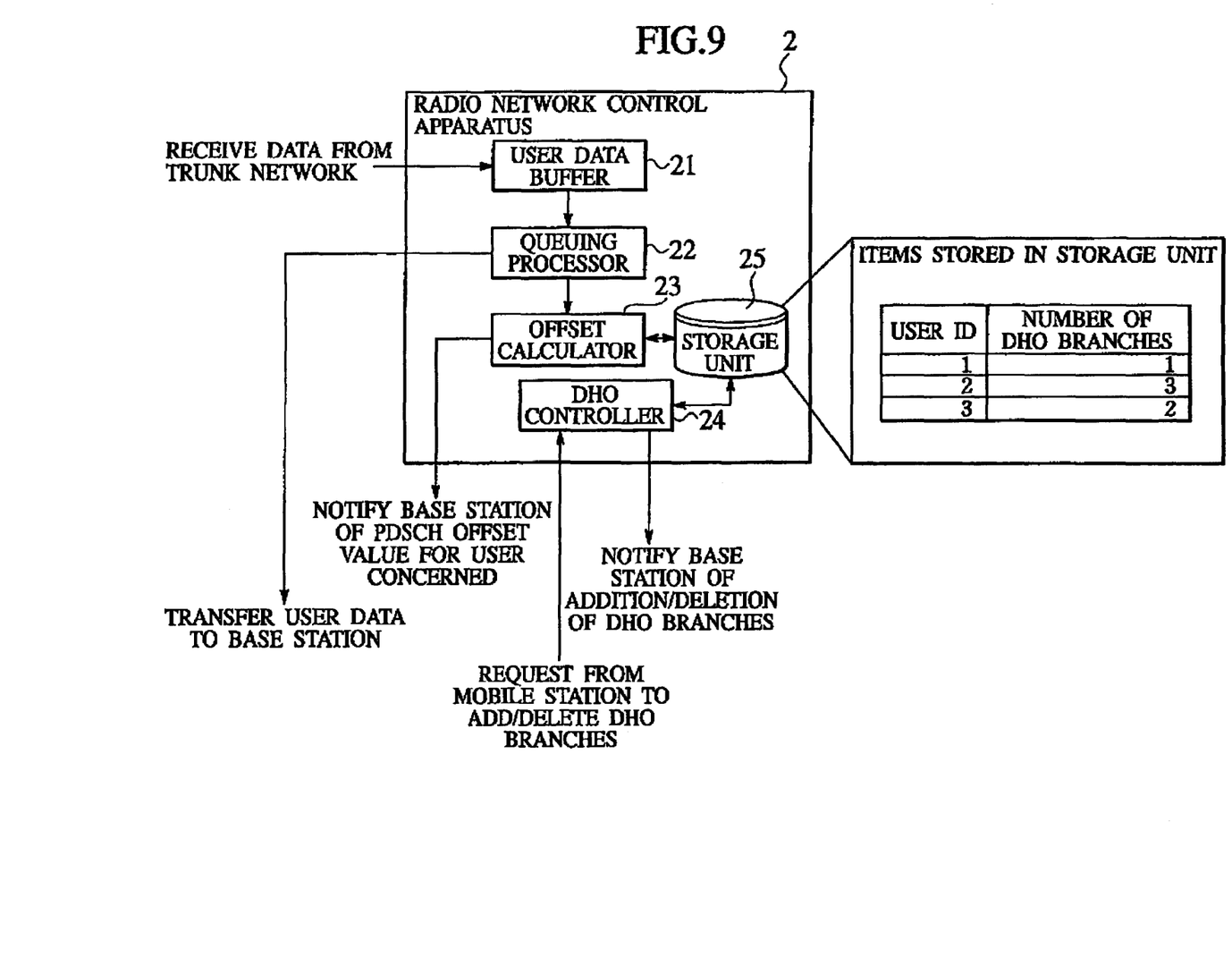
FIG. 9 is a block diagram showing a functional configuration of a radio network control apparatus in a mobile packet communication system according to a first embodiment of the present invention.

The present invention will be explained with reference to the embodiments shown in the drawings. FIG. 9 shows a functional configuration of a radio network control apparatus 2 in a mobile packet communication system according to an embodiment of the present invention. A hardware configuration of the mobile packet communication system is the same as that of FIG. 1 explained in connection with the prior art. In this system, the embodiment of the present invention is characterized by the radio network control apparatus 2.

The mobile packet communication system shown in FIG. 1 consists of the exchange apparatus 1, radio network control apparatus 2, and base stations 3-1, 3-2, 3-3, . . . arranged in a step configuration. The mobile stations 4-1, 4-2, . . . that may be cellular phones possessed by users, respectively communicate with the base stations through radio channels.

The radio network control apparatus 2 centrally controls the base stations by specifying an offset value for a shared downlink channel PDSCH and by issuing instructions to add and remove DHO braches.

In FIG. 9, the radio network control apparatus 2 includes a user data buffer 21 to receive data from a trunk network and store the received data, a queuing processor 22 to execute a queuing process, an offset calculator 23 to calculate an offset value to be explained later, a DHO controller 24 to control DHO branches, and a storage unit 25 to store necessary data.

The user data buffer 21 of the radio network control apparatus 2 receives through the trunk network user data bound for user mobile stations and temporarily stores the received data. The queuing processor 22 controls a transmission sequence of data for the mobile stations and transfers the user data stored in the user data buffer 21 to the mobile stations.

The offset calculator 23 calculates an offset value for a PDSCH of each base station related to a given user mobile station and issues a command for the offset value.

The DHO controller 24 responds to a branch add/delete request from a mobile station and controls base stations to set branches according to the request. After adding/deleting DHO branches, the DHO controller 24 updates information related to the number of DHO branches of the user mobile station in question stored in the storage unit 25.

The storage unit 25 stores the number of DHO branches of each mobile station and a data table of offset values corresponding to the numbers of branches of 1, 2, and 3.

Figure 10:
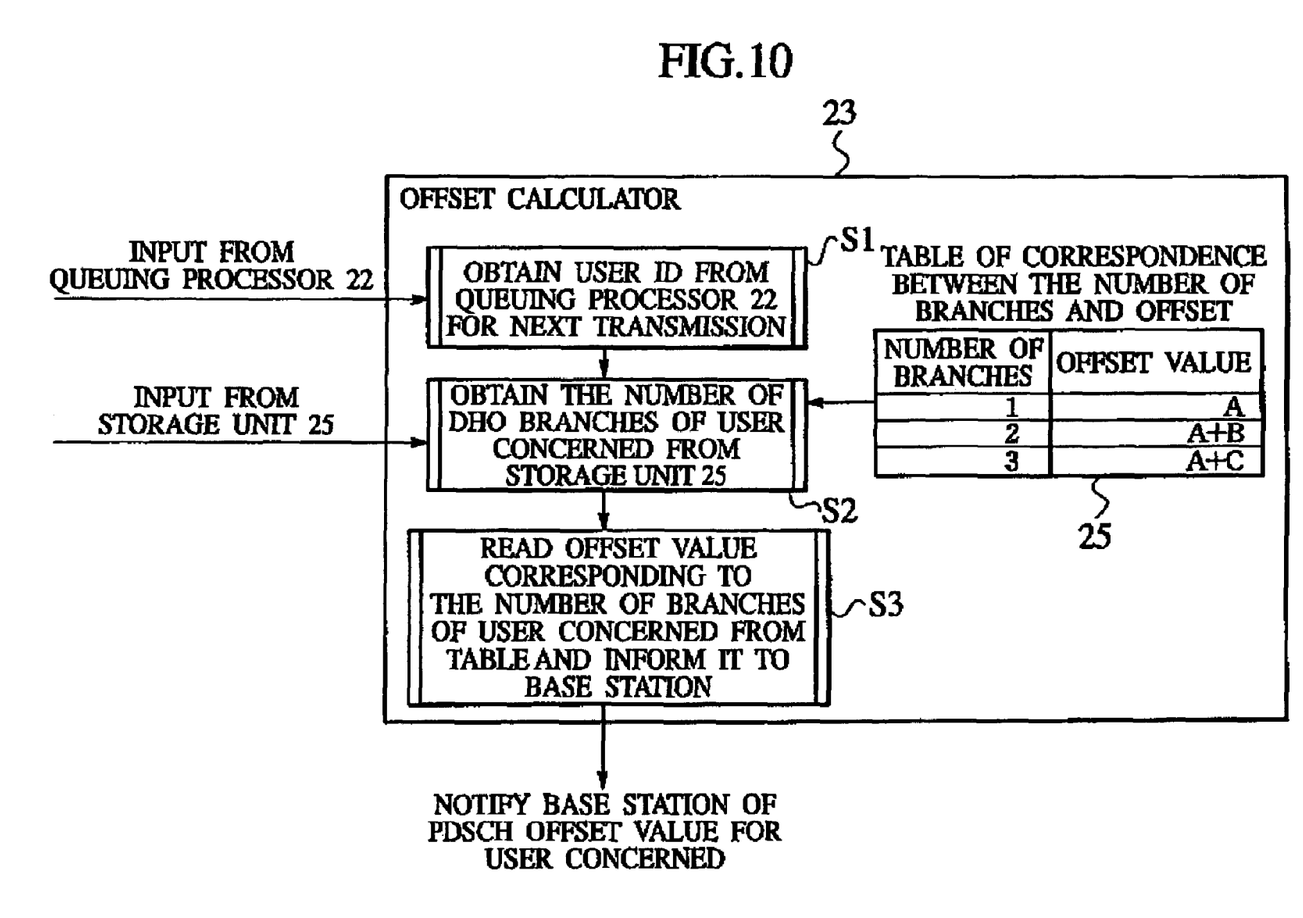
FIG. 10 is a flowchart showing a process executed by the above-mentioned radio network control apparatus.

A processing function of the offset calculator 23 will be explained with reference to the flowchart of FIG. 10. The offset calculator 23 receives an ID notification for a transmission target mobile station from the queuing processor 22 and retrieves the number of DHO branches related to the user ID from the storage unit 25 (steps S1 and S2).

If the retrieved number of DHO branches is 1, the offset calculator 23 issues a command to command a base station to use a normal offset value A. If the number of DHO branches is 2, the offset calculator 23 notifies the base station of a value "A+B" obtained by adding B (dB) to the offset A. If the number of DHO branches is 3, the offset calculator 23 notifies the base station of a value "A+C" by adding C (dB) to the offset A (step S3).

The offset adjusting values B and C may preferably be about 3 (dB) and 5 (dB), respectively. This is because if the number of DHO branches is 2, it is assumed that the transmission power of a downlink physical channel A-DPCH has been halved, and therefore, about 3 (dB) will be appropriate. If the number of DHO branches is 3, the transmission power of the A-DPCH will be about ⅓ of the value for the number of DHO branches of 1, and therefore, 5 (dB) will be appropriate.

In this way, the mobile packet communication system according to the embodiment of the present invention changes an offset value applied to the transmission power of a downlink shared channel PDSCH during a diversity (DHO) operation in response to the number of DHO branches. The embodiment can substantially equalize the transmission power of a PDSCH, which is sent from a specific base station to a mobile station during DHO, to a combined transmission power of A-DPCHs simultaneously transmitted from a plurality of base stations to the mobile station, thereby maintaining the quality of the PDSCH during DHO.

According to the embodiment mentioned above, the storage unit 25 of the radio network control apparatus 2 keeps the data table of offset values corresponding to the numbers of DHO branches, and the offset calculator 23 retrieves an offset value corresponding to a given number of DHO branches from the storage unit 25. This does not limit the present invention. The offset calculator 23 may calculate an offset value according to a functional operation expression f(x) where "x" is a variable representative of the number of DHO branches.

Next, a mobile packet communication system according to the second embodiment of the present invention will be explained with reference to FIGS. 11 to 13. The present invention is applicable to an HSDPA (High Speed Downlink Packet Access) method, to control the transmission power of an HS-SCCH (High Speed Shared Control CHannel) that is a control signal transmission channel.

Figure 11:
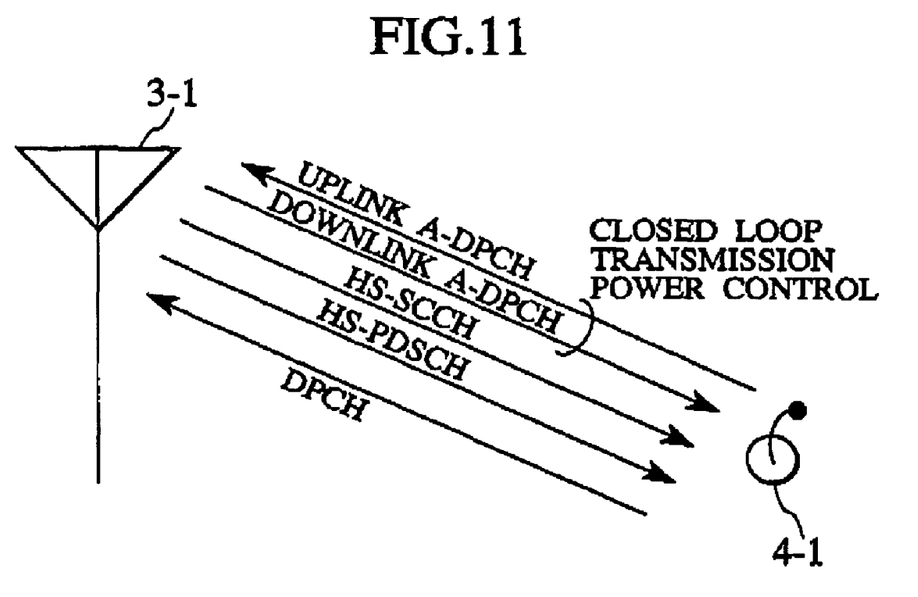
FIG. 11 is an explanatory view showing signal channels for communication between a base station and a mobile station according to a mobile packet communication system employing an HSDPA method.

The HSDPA method is a method shown in FIG. 11 having a channel configuration of (1) HS-PDSCH: a downlink data signal transmission channel; (2) HS-SCCH: a control signal transmission channel; and (3) downlink A-DPCH: a transmission power control dedicated channel and uplink A-DPCH: a data signal and control signal transmission channel.

For (1) HS-PDSCH, the method fixes the transmission power thereof and increases or decreases a transmission data quantity thereof in response to a signal state. For (2) HS-SCCH, the method variably controls the transmission power thereof in response to a signal state. Control signals transmitted on the HS-SCCH include control information such as a transmission data size and a transmission originator in connection with packet data sent on the HS-PDSCH.

The system of this embodiment employs the same hardware configuration as that of the first embodiment shown in FIG. 1. The transmission power of the base stations 3-1, 3-2, . . . is controlled by the radio network control apparatus 2.

Figure 12:
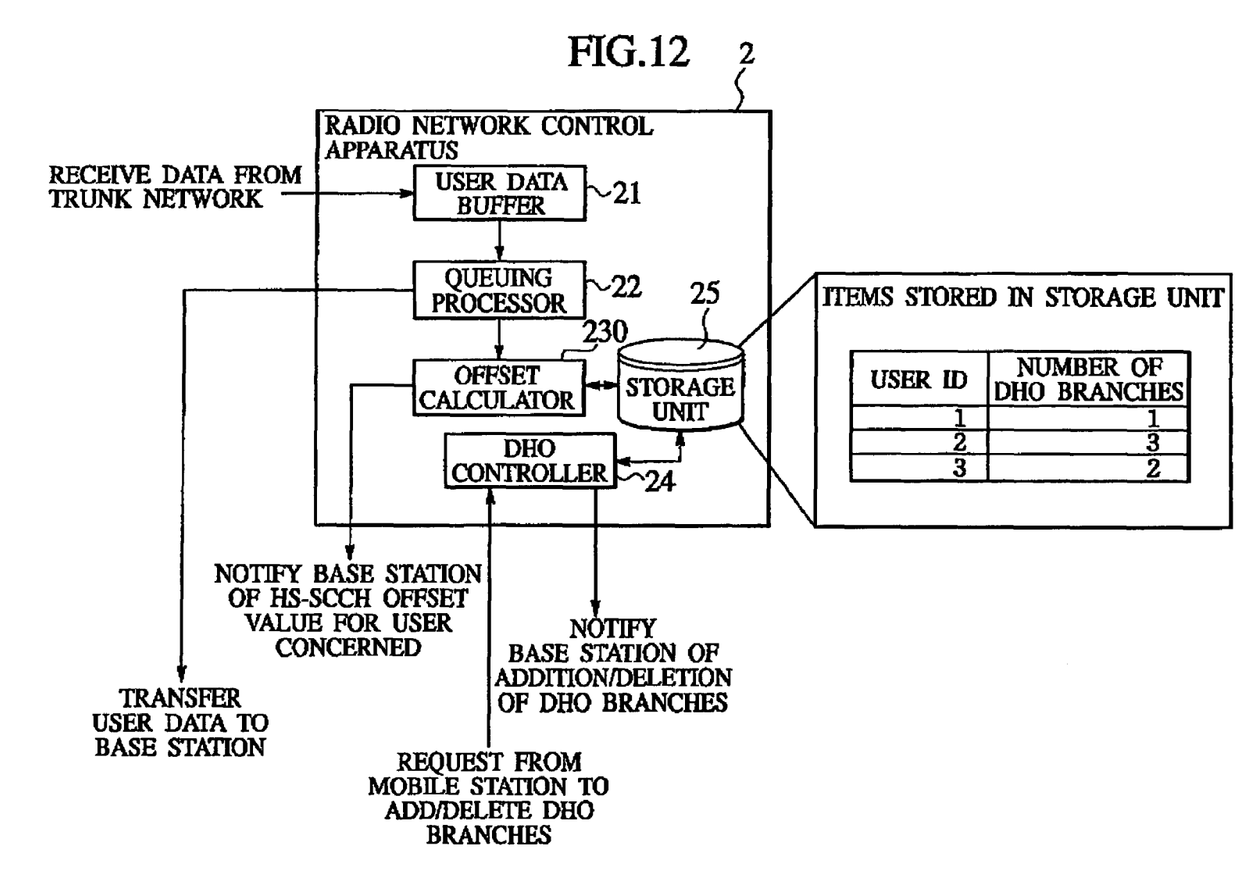
FIG. 12 is a block diagram showing a functional configuration of a radio network control apparatus in a mobile packet communication system according to a second embodiment of the present invention.
Figure 13:
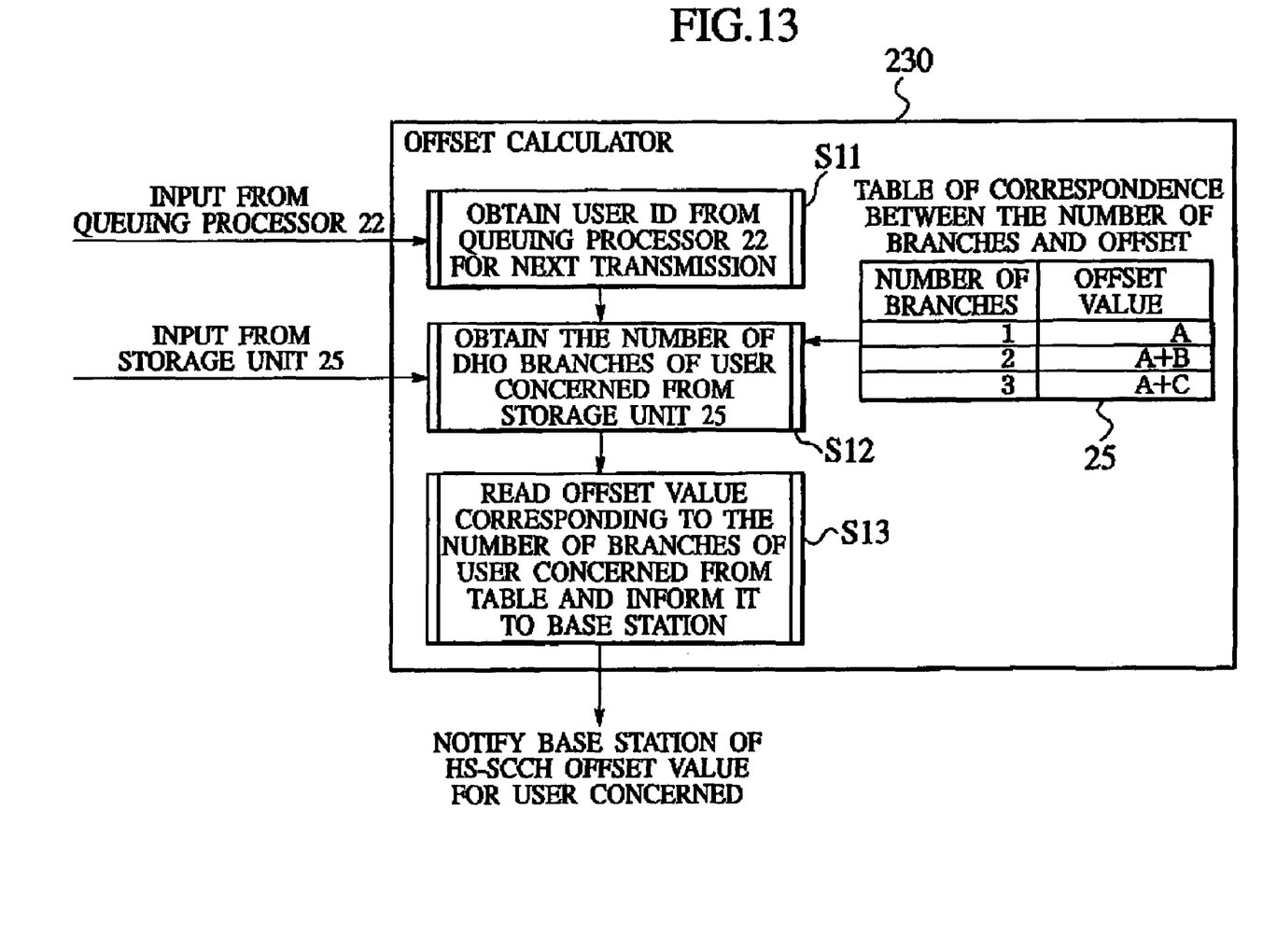
FIG. 13 is a flowchart showing a process executed by the above-mentioned radio network control apparatus.

In FIG. 12, the radio network control apparatus 2 consists of a user data buffer 21, a queuing processor 22, an offset calculator 230, a DHO controller 24, and a storage unit 25. This configuration is substantially the same as that of the first embodiment shown in FIG. 9. The processing functions of the user data buffer 21, queuing processor 22, DHO controller 24, and storage unit 25 are the same as those of the first embodiment.

The second embodiment is characterized by the offset calculator 230 that calculates, for each base station, an offset value applied to the HS-SCCH for a user mobile station concerned and issues a command for the calculated offset value.

The processing function of the offset calculator 230 will be explained with reference to the flowchart of FIG. 13. Basically, the processing function is the same as that of the offset calculator 23 of the first embodiment. Upon receiving a notification of an ID concerning a transmission target mobile station from the queuing processor 22, the offset calculator 230 retrieves the number of DHO branches related to the user ID from the storage unit 25 (steps S11 and S12).

If the retrieved number of DHO branches is 1, a command to use a normal offset value A is issued to a base station, If the number of DHO branches is 2, a command to use a value "A+B" obtained by adding B (dB) to the offset is issued to the base station, and if the number of DHO branches is 3, a command to use a value "A+C" obtained by adding C (dB) to the offset is issued to the base station (step S13). The adjusting values for the offset are the same as those of the first embodiment.

In this way, the mobile packet communication system according to this embodiment switches offset values for the transmission power of a downlink HS-SCCH from one to another during a diversity (DHO) operation in response to the number of DHO branches. Accordingly, the embodiment can substantially equalize the transmission power of an HS-SCCH, which is sent from a specific base station to a mobile station during DHO, to a combined transmission power of A-DPCHs simultaneously transmitted from a plurality of base stations to the mobile station, thereby maintaining the quality of the HS-SCCH during DHO.

INDUSTRIAL APPLICABILITY

As mentioned above, the present invention controls each base station that relates to communication with a given mobile station in such a way as to increase an offset for the transmission power of a second downlink radio channel relative to the transmission power of a first downlink radio channel if the number of diversity branches is large, and if the number of diversity branches is small, decrease the offset. Accordingly, the present invention can substantially equalize the transmission power of a second downlink signal, which is sent from a specific base station through the second downlink radio channel to the mobile station during a diversity operation, to a combined transmission power of the first downlink radio channels simultaneously transmitted from a plurality of base stations to the mobile station. Namely, the present invention can control a specific base station to maintain the quality of the second downlink signal transmitted from the specific base station to a mobile station during a diversity operation.

The invention claimed is:

1. A transmission power controlling method for a mobile packet communication system involving a mobile station, a plurality of base stations, and a radio network control apparatus that controls the base stations to achieve radio packet communication between the mobile station and one or a plurality of the base stations, the method comprising:
   a step in which the mobile station checks a signal state of a first downlink radio channel from each of one or a plurality of the base stations from which the mobile station can receive signal radio waves, and based on the signal state of the first downlink radio channel, transmits a transmission power control command to command a transmission power increase or decrease to each of the base stations through an uplink radio channel paired with the first downlink radio channel;
   a step in which each of the one or plurality of base stations specified by the radio network control apparatus to conduct communication with the mobile station checks a signal state of the uplink radio channel from the mobile station, and based on the signal state of the uplink radio channel, transmits a transmission power control command to command a transmission power increase or decrease through the first downlink radio channel paired with the uplink radio channel;
   a step in which the radio network control apparatus detects the number of diversity branches of the mobile station communicating with the base stations, increases an offset if the detected number of diversity branches is larger than a predetermined number, and decreases the offset if the number of diversity branches is smaller than the predetermined number, to thereby determine the offset;
   a step in which the radio network control apparatus specifies, from among the one or plurality of base stations, a transmitter base station to transmit signals to the mobile station through a second downlink radio channel and notifies the transmitter base station to set transmission power of the second downlink radio channel to transmit signals to the mobile station by multiplying transmission power of the first downlink radio channel by the offset; and
   a step in which the transmitter base station to transmit signals to the mobile station through the second downlink radio channel adjusts transmission power of the second downlink radio channel according to the notification from the radio network control apparatus and transmits downlink signals transferred from the radio network control apparatus.

2. The transmission power controlling method of claim 1, wherein the mobile packet communication system employs a PDSCH, the first downlink radio channel is a downlink A-DPCH, the uplink radio channel is an uplink A-DPCH, and the second downlink radio channel is the PDSCH.

3. The transmission power controlling method of claim 1, wherein the mobile packet communication system employs an HS-PDSCH, the first downlink radio channel is a downlink A-DPCH, the uplink radio channel is an uplink A-DPCH, and the second downlink radio channel is an HS-SCCH.

4. A transmission power controlling method for a radio network control apparatus in a mobile packet communication system for providing mobile packet communication for a plurality of mobile stations, comprising:
   a step of making each of one or a plurality of base stations transmit a first downlink signal for a specific mobile station through a first downlink radio channel;
   a step of detecting the number of diversity branches of the mobile station communicating with the base stations, increasing an offset if the detected number of diversity branches is larger than a predetermined number and decreasing the offset if the number of the diversity branches is smaller than the predetermined number, to thereby determine the offset; and
   a step of specifying, from among the one or plurality of base stations, a transmitter base station to transmit a downlink signal to the mobile station through a second downlink radio channel and notifying the transmitter base station to set transmission power of the second downlink radio channel by multiplying transmission power of the first downlink radio channel by the offset.

5. The transmission power controlling method for a radio network control apparatus of claim 4, wherein the offset for transmission power of the second downlink radio channel is an integer multiple of the number of diversity branches.

6. The transmission power controlling method for a radio network control apparatus of claim 4, wherein the offset for transmission power of the second downlink radio channel is determined by selecting one corresponding to the number of diversity branches from a data table registered in advance.

7. The transmission power controlling method for a radio network control apparatus of any one of claims 4 to 6, wherein the mobile packet communication system employs a PDSCH, the first downlink radio channel is a downlink A-DPCH, and the second downlink radio channel is the PDSCH.

8. The transmission power controlling method for a radio network control apparatus of any one of claims 4 to 6, wherein the mobile packet communication system employs an HS-PDSCH, the first downlink radio channel is a downlink A-DPCH, and the second downlink radio channel is an HS-SCCH.

9. A radio network control apparatus for controlling transmission power of a base station that provides mobile packet communication for a mobile station, comprising:
   a diversity branch controller to control an increase or a decrease in the number of diversity branches;
   a storage unit to store the number of diversity branches of each connected mobile station; and
   an offset calculator to determine an offset value for transmission power of a specific downlink radio channel for the mobile station according to the number of diversity branches of the mobile station stored in the storage unit and notify the base station of the offset value.

10. The radio network control apparatus of claim 9, wherein the offset calculator determines the offset for transmission power of the specific downlink radio channel as an integer multiple of the number of diversity branches.

11. The radio network control apparatus of claim 9, wherein the offset calculator determines the offset for transmission power of the specific downlink radio channel by selecting one corresponding to the number of diversity branches from a data table registered in advance in the storage unit.

12. The radio network control apparatus of any one of claims 9 to 11, wherein the mobile packet communication employs a PDSCH and the offset for transmission power of the specific downlink radio channel is an offset for transmission power of the PDSCH relative to transmission power of a downlink A-DPCH.

13. The radio network control apparatus of any one of claims 9 to 11, wherein the mobile packet communication employs an HS-PDSCH and the offset for transmission power of the specific downlink radio channel is an offset for transmission power of an HS-SCCH relative to transmission power of a downlink A-DPCH.

* * * * *